June 1, 1954            C. P. SMITH            2,680,228
OPTIMUM FILTER FOR DETECTING AND
DIFFERENTIATING COMPLEX SIGNALS
Filed June 27, 1952
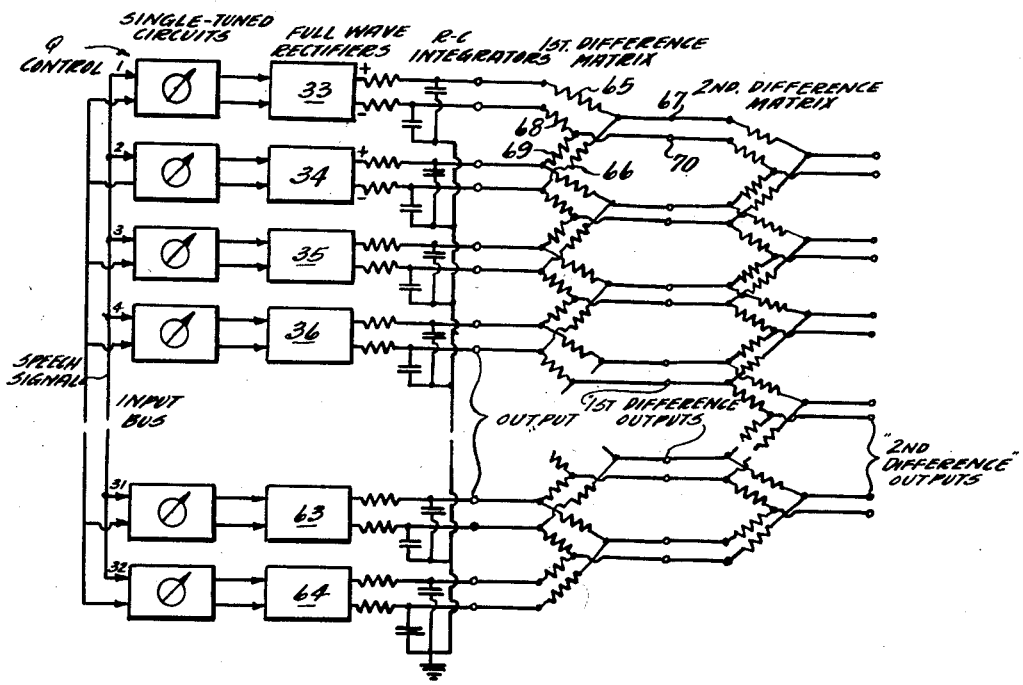
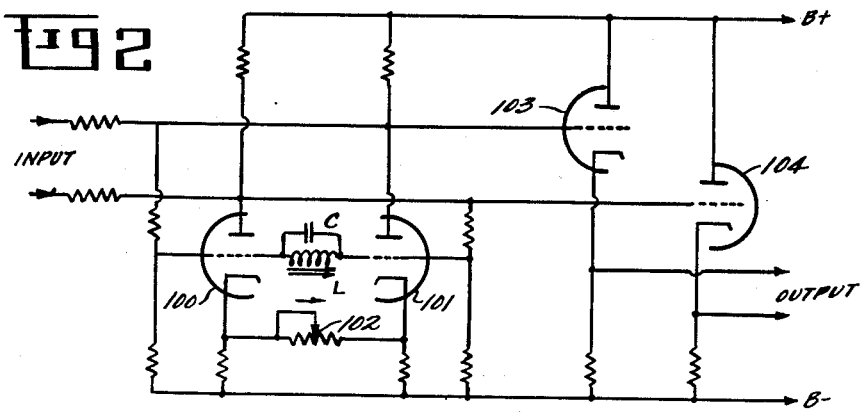
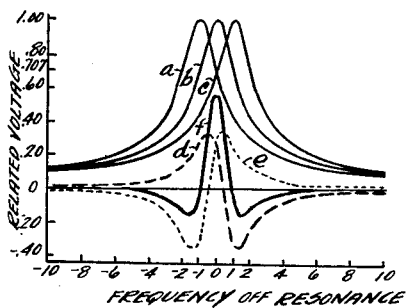
INVENTOR.
CALDWELL P. SMITH
BY Maurice H. Klitzman
AGENT
Wade Korntz
ATTORNEY

Patented June 1, 1954

UNITED STATES PATENT OFFICE

2,680,228

2,680,228
OPTIMUM FILTER FOR DETECTING AND DIFFERENTIATING COMPLEX SIGNALS

Caldwell P. Smith, Boston, Mass., assignor to the United States of America as represented by the Secretary of the Air Force Application June 27, 1952, Serial No. 296,102

4 Claims. (Cl. 324—77)

(Granted under Title 35, U. S. Code (1952), sec. 266)

The invention described in the following specification and claims may be manufactured and used by or for the Government for governmental purposes without the payment to me of any royalty thereon.

This invention relates to filters and more particularly to a plurality of filters all having a common input whereby when a complex signal is applied to the input, each of the filters will produce an output which indicates the amount of energy in the complex signal which lies within the pass characteristic of the particular filter.

In the art of speech analyzing, complex electrical signals representative of the speech to be analyzed are passed through analyzing filters wherein each filter produces an output indicating the amount of energy in the complex signal which lies within the band pass characteristic of the particular filter, and then the outputs of the various filters are displayed. For example, on a spectrograph or spectrogram and then by viewing the output one may recognize certain characteristics of the speech. In certain speech analyzers the output of the analyzing filter is displayed as a time-frequency-intensity display and with this display those frequency ranges or bands containing the greater amounts of energy usually appear as bars, and the absolute position or the relative positions of those bars on the frequency scale will be an indication of the sound. Those bars are oftentimes referred to as formants. Since the filters which make up the analyzing filter should have a characteristic such that they will produce readily recognizable bars or formants, the band pass characteristic of each of the filters must be determined from a knowledge of the essential characteristics which produce the formants. The band pass characteristics of analyzing filters may be made according to any desired scale, however, the scale which is chosen for purposes of illustrating this invention is known as the Koenig scale, which scale is approximately 100 C. P. S. band widths for the filters in the frequency range from 100 to 1000 C. P. S. and for those filters above 1000 C. P. S. the band widths gradually increase being spaced on a logarithmic scale.

In previously known types of analyzing filters, the relatively low Q of the filters does not provide adequate selectivity to discriminate some of the vowel sounds whose formants differ by only small frequency increments.

In accordance with this invention in order to increase the selectivity above that which the single tuned circuits can provide, while still retaining other essential characteristics, an interpolation process is used: the rectified, smooth outputs of adjacent filters are combined, i. e. algebraically added, to obtain a signal proportional to the difference between signal levels in adjacent filter bands; this process is repeated to produce a signal proportional to the second difference between adjacent filters.

An object of this invention is to provide a speech analyzing filter having greatly increased selectivity and therefore improve its ability to discriminate some of the vowel sounds whose formants differ by only small frequency increments.

The above object, as well as other objects, features and advantages of the apparatus of this invention will be more clearly understood in view of the following description when taken in conjunction with the drawings wherein:

Fig. 1 is a schematic diagram in block form of the speech analyzer of this invention.

Fig. 2 is a schematic diagram of one of the tuned circuits illustrated in block form in Fig. 1.

Fig. 3 is a graph which illustrates the frequency characteristic of one of the channels of of the analyzing filter of this invention.

Referring now to the drawings, and more particularly to Fig. 1 thereof, an electrical signal representative of a complex speech signal is applied to the input bus. The single tuned circuits 1 through 32 have their inputs connected to the input bus. As illustrated in the drawings there are 32 tuned circuits, which are a result of the type of frequency scale used which was previously referred to as the Koenig scale. The tuned circuits 1 through 32 have center frequencies $f_0$ and band widths $\Delta f$ in accordance with the following table:

*Table.—Filter frequencies and bandwidths*

| | $f_0$ (cycles/sec.) | $\Delta f$ (cycles/sec.) |
|---|---|---|
| 1 | 97 | 50 |
| 2 | 158 | 75 |
| 3 | 245 | 100 |
| 4 | 347 | 100 |
| 5 | 448 | 100 |
| 6 | 548 | 100 |
| 7 | 649 | 100 |
| 8 | 749 | 100 |
| 9 | 849 | 100 |
| 10 | 949 | 100 |
| 11 | 1,040 | 108 |
| 12 | 1,165 | 117 |
| 13 | 1,287 | 127 |
| 14 | 1,420 | 138 |
| 15 | 1,564 | 150 |
| 16 | 1,720 | 162 |
| 17 | 1,888 | 176 |
| 18 | 2,070 | 190 |
| 19 | 2,270 | 206 |
| 20 | 2,481 | 223 |
| 21 | 2,715 | 243 |
| 22 | 2,968 | 263 |
| 23 | 3,244 | 285 |
| 24 | 3,540 | 309 |
| 25 | 3,863 | 340 |
| 26 | 4,212 | 362 |
| 27 | 4,591 | 394 |
| 28 | 5,000 | 427 |
| 29 | 5,445 | 463 |
| 30 | 5,930 | 500 |
| 31 | 6,430 | 500 |
| 32 | 6,930 | 500 |

It will be understood of course that the particular frequency scale used will be dependent upon the type of speech analyzer which is to be used. The output of each of the tuned circuits is connected to a full wave rectifier, there being 32 full wave rectifiers illustrated in the drawings and designated by the numbers 33 through 64. The output of each of the full wave rectifiers is a balanced signal; that is, separate positive and negative polarity voltages of equal amplitude are developed.

Each of the outputs of each of the full wave rectifiers has a smoothing circuit consisting of a resistor and condenser and preferably all of the smoothing circuits have equal time constants of 1/50 of a second. This selected time constant helps to minimize the differences in time response due to differences in band widths of the filters. The outputs of adjacent full wave rectifiers are subtracted in what I choose to call a first difference matrix. It will be noted in the drawings that the positive output of the full wave rectifier 33 and the negative output of the full wave rectifier 34 are connected by resistors 65 and 66 respectively to the output terminals 67 and the negative output of the full wave rectifier 33 and the positive output of the full wave rectifier 34 are connected through resistors 68 and 69 respectively to the output terminal 70 of the first difference matrix. It will be noted from the drawings that all of the full wave rectifiers are similarly connected by the first difference matrix to produce 31 balanced outputs in the output of the first difference matrix. Each of the balanced outputs of the first difference matrix therefore is the difference between the output of one of the rectifiers and its adjacent rectifier or rectifiers. The outputs of the first difference matrix are again connected through resistances in the same manner in which the outputs of the rectifiers were connected in the first difference matrix. The resistance connections of the outputs of the first difference matrix are what I choose to call a second difference matrix which has 30 outputs each of which is the difference between any one of the outputs of the first difference matrix and its adjacent output or outputs.

Referring now to Fig. 3 wherein the response curve of one single tuned circuit, for example, tuned circuit 1 of Fig. 1, is identified by the letter "a," the response curve for another tuned circuit, for example, tuned circuit 2 of Fig. 1, is identified by the letter "b" and the response curve for another tuned circuit, for example, tuned circuit 3 of Fig. 1, is identified by the letter "c." The difference between the response curve "a" and the response curve "b" is identified in the drawings as curve "d" and the difference between the response curve "b" and the response curve "c" is identified by the curve marked "e." The response curve "f" of Fig. 3 is the second difference response, that is, the difference between the curve "d" and curve "e." It will be noted that by the arrangement of Fig. 1 there is produced 30 balanced outputs each of which has a very high Q response and due to the increased selectivity by this arrangement, it will be easier to discriminate between those vowel sounds whose formants differ by only small frequency increments.

Although any desired circuit may be used for the tuned circuits 1 through 32 of Fig. 1, provided of course that those tuned circuits have the frequency characteristics essential to the particular scale of the frequency analyzer, a tuned circuit which is particularly well suited for each of those tuned circuits is illustrated in Fig. 2.

Referring now to Fig. 2, a small variable inductance "L" is shunted by a micacapacitor "C" to constitute an audio frequency resonant circuit and this resonant circuit is connected in shunt to the input. In order to provide control of the band width of the tuned circuit "LC," as well as to increase the Q over that obtainable with inductors and capacitors alone, the tuned circuit is shunted with variable negative resistance circuit elements, which as shown in the drawings consists of the triode section 100 and the triode section 101 and their associated circuits. The resistor 102 in the cathode circuit of each of the triodes 100 and 101 furnishes a control for the amount of negative resistances or feed back. The output of the tuned circuit is preferably applied to cathode followers 103 and 104. The tuned circuits 1 through 32 of Fig. 1 may all be identical in construction except for the values of the inductors and capacitors and those inductors and capacitors may be assembled as a plug-in unit.

The above arrangement greatly enhances the selectivity of analyzing filters, as well as providing channels which tend to respond to the curvature of the spectrum of the input signal over the measured interval, tending to discriminate against noise and noise like signals. The channels must be carefully adjusted to have equal gains, band widths and integration constants, and differ by only small frequency increments for this discrimination against noise to occur.

It will be apparent to those skilled in the art, that the particular details for the balanced rectifiers need not be shown, since many and various types of circuits are known which may be used to perform the function. Although the difference matrices have been shown to be of the resistance type, many other types of difference detecting circuits may be used.

Although I have in accordance with the statutes disclosed a specific preferred embodiment of my invention, it will be understood that many additions, omissions and modifications may be made to the apparatus without departing from the spirit and scope of my invention.

What is claimed is:

1. A speech analyzing filter comprising a first tuned circuit, a second tuned circuit, a third tuned circuit, each of said tuned circuits having a center frequency which differs from the center frequency of the other tuned circuits, means to produce a rectified balanced signal from the output of each of said tuned circuits, means for producing a first signal proportional to the difference between the rectified output of said first tuned circuit and the rectified output of said second tuned circuit, means for producing a second signal proportional to the difference between the rectified output of said second tuned circuit and the rectified output of said third tuned circuit and means to produce a third signal proportional to the difference between said first signal and said second signal.

2. The combination as in claim 1 wherein said means for producing a first signal proportional to the difference between the rectified output of said first tuned circuit and the rectified output of said second tuned circuit comprises resistors in series connecting the positive output of said first tuned circuit with the negative output of said second tuned circuit and resistors in series connecting the negative output of said first tuned circuit with the positive output of said second tuned circuit; and wherein said means for producing a second signal proportional to the difference to the rectified output of said second tuned circuit and the rectified output of said third tuned circuit comprises resistors in series connecting the positive output of said second tuned circuit to the negative output of said third tuned circuit, and resistors in series connecting the negative output of said second tuned circuit to the positive output of said third tuned circuit.

3. The combination as in claim 1, wherein the means for producing a third signal proportional to the difference between said first signal and said second signal comprises resistors in series connecting the positive output of said first signal with the negative output of said second signal and resistors connecting the negative output of said first signal with the positive output of said second signal.

4. A speech analyzing filter comprising a first tuned circuit, a second tuned circuit, a third tuned circuit, each of said tuned circuits having a center frequency which differs from the center frequency of the other tuned circuits, means for producing a rectified balanced signal from the output of each of said tuned circuits, means for producing a signal having a narrow band width comprising a first series of center tapped resistors connected to the opposite poles of adjacent tuned circuits, so as to obtain a first difference voltage output at each first series center tap, a second series of center tapped resistors connected to alternate first series center taps so as to obtain a second difference voltage output at the second series center taps.

References Cited in the file of this patent
UNITED STATES PATENTS

| Number | Name | Date |
|---|---|---|
| 2,323,609 | Kihn | July 6, 1943 |
| 2,429,229 | Koenig, Jr. | Oct. 21, 1947 |